(12) United States Patent
Milanowski et al.

(10) Patent No.: US 6,605,781 B2
(45) Date of Patent: Aug. 12, 2003

(54) CABLE GUIDE FOR A SEALED BOX, AND A SEALING ASSEMBLY INCLUDING SUCH A GUIDE

(75) Inventors: Michel Milanowski, Anserville (FR); Alain Vincent, Juilly (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/119,770

(22) Filed: Apr. 11, 2002

(65) Prior Publication Data

US 2002/0151209 A1 Oct. 17, 2002

(30) Foreign Application Priority Data

Apr. 12, 2001 (FR) .............................. 01 05048

(51) Int. Cl.⁷ .............................................. H02G 15/02
(52) U.S. Cl. ........................ 174/74 R; 174/93; 439/589
(58) Field of Search ............................ 174/74 R, 84 R, 174/65 R, 65 G, 93; 439/461, 462, 589

(56) References Cited

U.S. PATENT DOCUMENTS

| 3,603,913 A | | 9/1971 | Hasty |
|---|---|---|---|
| 3,622,942 A | | 11/1971 | Rynk |
| 4,355,855 A | * | 10/1982 | Rebikoff ..................... 439/275 |
| 4,358,079 A | * | 11/1982 | Navarro ....................... 248/56 |
| 4,961,713 A | * | 10/1990 | McCracken et al. ......... 439/587 |
| 5,703,328 A | | 12/1997 | Johannsen |
| 5,912,434 A | * | 6/1999 | Robinson ..................... 174/78 |
| 6,232,554 B1 | * | 5/2001 | Yamazaki et al. ............ 174/65 |

FOREIGN PATENT DOCUMENTS

| DE | 2 249 368 A | 4/1974 |
|---|---|---|
| EP | 0 942 507 A1 | 9/1999 |

* cited by examiner

*Primary Examiner*—Chau N. Nguyen
(74) *Attorney, Agent, or Firm*—Sughrue Mion, PLLC

(57) ABSTRACT

A cable guide, in particular for an optical or electrical cable for telecommunications, includes a cylindrical portion for coming into abutment via one of its ends against a sealing gasket for mounting at the inlet to a sealed box for protecting splices and containing a gas under pressure in a tubular passage secured to the box, and being designed via its opposite end to be subjected to thrust from a nut screwed onto the tubular passage. This portion is extended away from the box by at least one radially deformable frustoconical tongue having a clamping portion at its end for clamping onto the periphery of the cable.

6 Claims, 2 Drawing Sheets

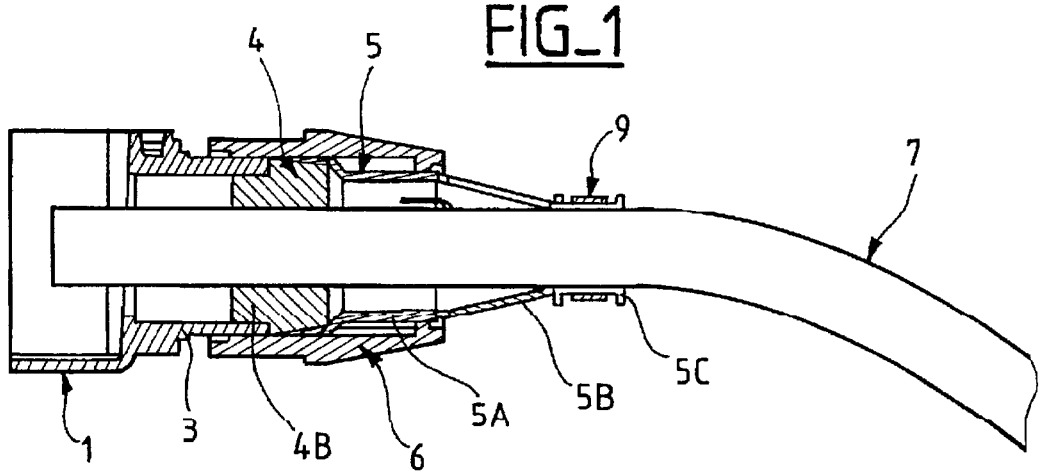
FIG_1
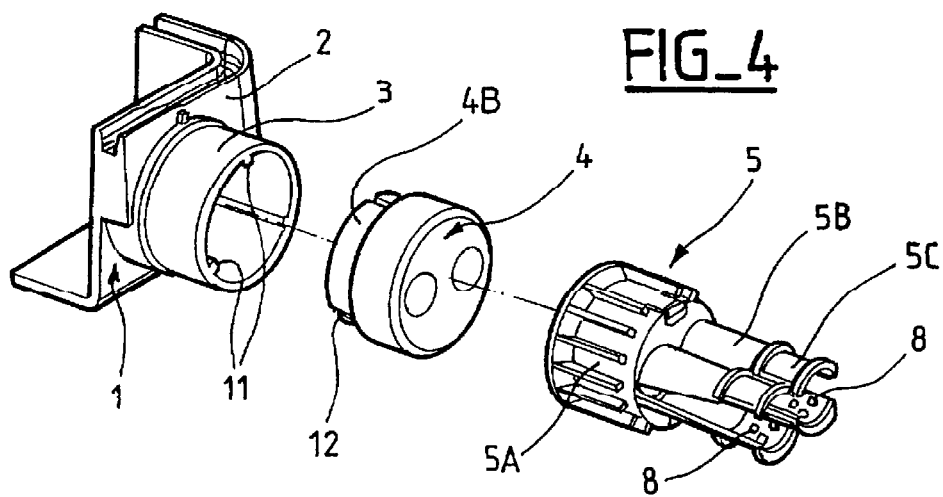
FIG_4
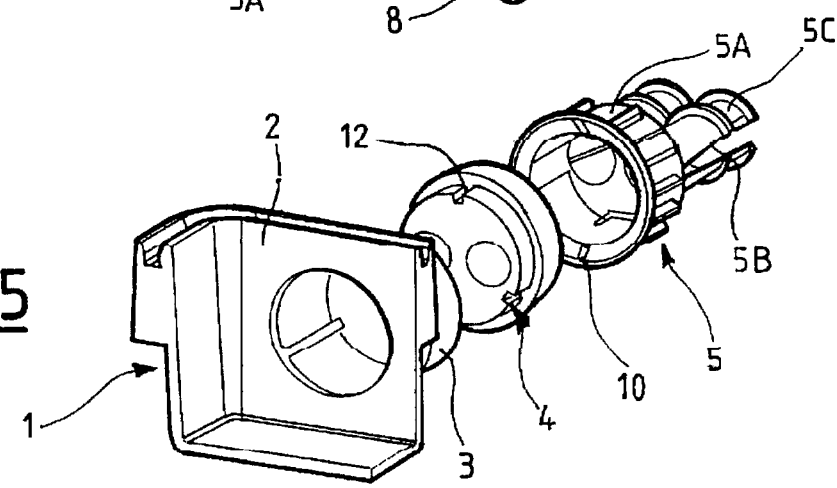
FIG_5

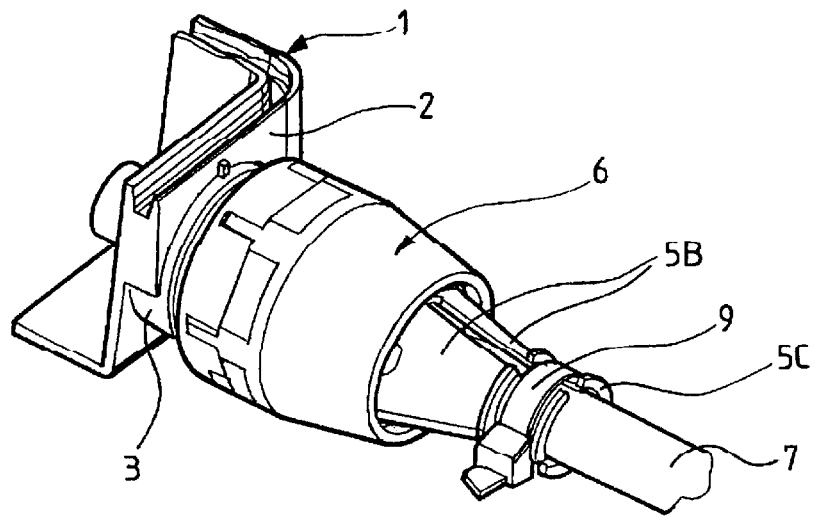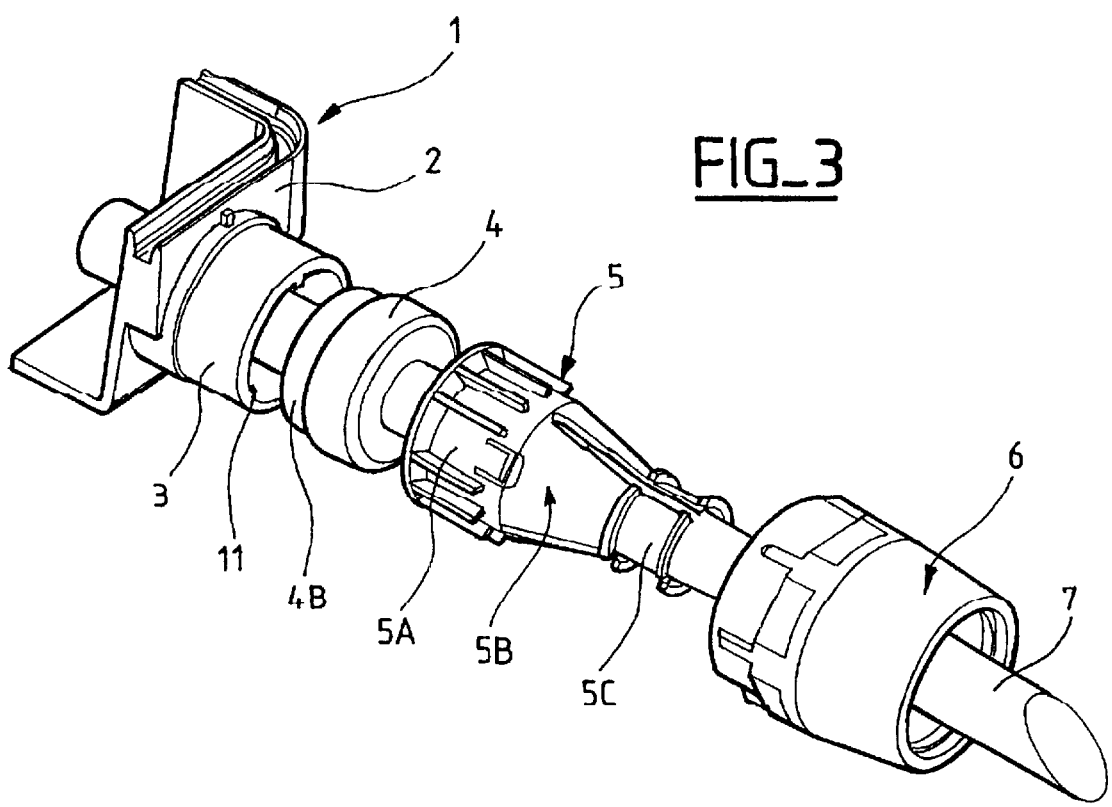

CABLE GUIDE FOR A SEALED BOX, AND A SEALING ASSEMBLY INCLUDING SUCH A GUIDE

The present invention relates to a cable guide for a sealed box and to a sealing assembly including such a guide.

More precisely, the invention relates to a cable guide, in particular for an optical or electrical cable for telecommunications, the guide comprising a cylindrical portion for coming into abutment via one of its ends against a sealing gasket for mounting in an inlet to a sealed box for protecting splices and containing a gas under pressure, the gasket being mounted in a tubular passage integral with the box and being designed to have its opposite end subjected to thrust by a nut screwed onto said passage.

BACKGROUND OF THE INVENTION

Such a guide is known from patent document EP-0 942 507.

That document describes a sealed equipment box with a cable access comprising a sealing assembly constituted by a presser device mounted at the end of the tubular passage for compressing a gasket installed around the cable. The presser device has a nut for screwing onto the end of the tubular passage and a presser bushing, commonly referred to as a "cable guide" or a "presser", inserted between the nut and the gasket. The bushing has a projecting central cylindrical portion enabling it to come peripherally into abutment at one end against an internal bearing ring in the nut and at the other end against a sleeve via a cylindrical portion. The guide is thus constituted by a cylindrical sleeve that does not come directly into contact with the cable.

In the event of the cable bending outside the box, e.g. when the cable is handled or when it needs to be curved for connection purposes, a force is applied to the end of the gasket and its internal bore is therefore deformed radially, with this releasing a gap between the bore and the cable that can give rise to leakage of the gas under pressure.

SUMMARY OF THE INVENTION

The invention solves this problem and to do this, according to the invention, the cylindrical portion of the guide is extended away from the box by at least one radially deformable frustoconical tongue having at its end a clamping portion for clamping onto the periphery of the cable.

Thus, the cable is held via the clamping portion at a position that is relatively far away from the gasket and as a result, in the event of the cable being bent, said clamping portion absorbs the deforming forces and avoids deformation occurring inside the gasket, thereby eliminating any risk of leakage.

Furthermore, given their elasticity, the tongues can adapt to a range of cable diameters, and the gasket is no longer dependent on a particular cable diameter.

In a preferred embodiment, said guide has at least two tongues distributed around the periphery of its end remote from the box.

In this way, the cable is held around its entire periphery ensuring that it is secured regardless of the direction in which bending might be applied.

Preferably, said clamping portion has locking teeth on its inside face directed towards the cable.

When the clamp is clamped onto the cable, these teeth bite into the covering of the cable and lock onto it.

Advantageously, a clamping collar is associated with said guide so as to be clamped onto said clamping portion.

The collar enables the clamping proton to be clamped in a manner that is particularly simple and effective.

Preferably, the guide has at least one locking spline on its end face directed towards the box.

This spline is designed to become anchored in the gasket and to prevent the cable from turning while the nut is being tightened.

The invention also provides a sealing assembly for cables, in particular an optical or electrical cable for telecommunications, the assembly being designed for mounting at the inlet of a sealed box for protecting splices and containing a gas under pressure, the assembly including a guide as described above.

In particular, said guide has at least one locking spline on its end face directed towards the box, the spline being designed to anchor in a sealing gasket placed in said tubular passage and prevented from rotating therein by an arrangement of associated splines and grooves, the guide being designed to have its opposite end subjected to thrust from a nut screwed onto said tubular passage.

BRIEF DESCRIPTION OF THE DRAWINGS

The invention is described below in detail with reference to the figures that show two preferred embodiments of the invention.

FIG. 1 is a longitudinal section view through a sealing assembly including a cable guide of the invention and intended for mounting a single cable.

FIG. 2 is a perspective view of the sealing assembly in the assembled state.

FIG. 3 is a perspective view of the sealing assembly in its state prior to mounting.

FIG. 4 is an exploded perspective view of a sealing assembly including a cable guide of the invention and designed to mount two cables.

FIG. 5 is an exploded perspective view of the FIG. 4 sealing assembly seen from the opposite end.

DETAILED DESCRIPTION OF THE PRESENT INVENTION

FIGS. 1 to 5 show sealing assemblies for cables, in particular for optical or electrical cables for telecommunications, that are to be mounted at inlets to a sealed box 1 for protecting splices and containing a gas under pressure. With optical cables, the gas can be air under pressure.

The box 1 comprises a cable inlet through a front face of the body 2 of the box. The inlet defines a tubular passage 3 that is completely closed around its periphery, being secured to the box 1 and having an outside face that is cylindrical and threaded. It receives a gasket 4 having an inside sealing portion 4B placed towards the inside of the box 1 and engaged within the passage 3, together with a conventional cable guide arrangement 5 and a nut or packing presser 6 screwed onto the threaded portion of the passage 3.

FIGS. 4 and 5 omit said nut in order to provide a better view of the cable guide 5.

The guide 5 has a cylindrical portion 5A designed to have one of its ends come into abutment against the gasket 4 and to have its other end subjected to thrust by the nut 6 screwed onto said passage 3. This portion 5A is extended away from the box 1 by at least one frustoconical tongue 5B that is radially deformable and that includes a clamping portion 5C at its end for clamping onto the periphery of a cable 7.

Preferably, and as shown, the guide 5 has at least two tongues 5B distributed around the periphery of its end remote from the box 1. In the variant shown in FIGS. 1 to 3, there are three tongues 5B, while in the variant shown in FIGS. 4 and 5, there are two tongues 5B. This serves to hold the cable effectively in all directions.

As can be seen more particularly in FIG. 4, the clamping portions 5C advantageously include locking teeth 8 on their inside faces directed towards the cable 7 for the purpose of clamping effectively onto the cable 7 when the clamping portions 5C are clamped together by means of a clamping collar 9 associated with said guide 5 and designed to be clamped onto said clamping portions 5C.

Advantageously, as can be seen in FIG. 5, the guide 5 has at least one locking spline 10 on its end face directed towards the box 1 for the purpose of anchoring in the sealing gasket 4 placed in said passage 3. A plurality of splines 10 are preferably provided distributed around the periphery of the guide 5 and anchoring in the gasket 4 when the nut 6 is tightened.

In addition, the gasket 4 is locked in the passage 3 by an arrangement of interfitting splines and grooves, advantageously splines 11 distributed around the periphery of the inside surface of the passage 3 and grooves 12 distributed around the periphery of the inside sealing portion 4B of the gasket 4.

In this way, once inserted in the passage 3, the gasket 4 is prevented from turning. During mounting, the guide 5 is anchored by means of its splines 10 in the gasket 4 and is likewise prevented from turning. The cable is clamped by the collar 9 acting on the guide 5. Consequently, while the nut 6 is being tightened, the cable 7 is prevented from turning. This is particularly useful for a sealing assembly that is designed to mount a plurality of cables, as shown in FIGS. 4 and 5, since under such circumstances, the cables are not in alignment on the axis of rotation of the nut and if they were not held in place they would be driven to turn around said axis, thereby causing them to bend and possibly leading to leakage of gas.

What is claimed is:

1. A cable guide, comprising a cylindrical portion for coming into abutment via one of its ends against a sealing gasket for mounting in an inlet to a sealed box for protecting splices and containing a gas under pressure, the gasket being mounted in a tubular passage secured to the box, and said guide being designed to have its opposite end subjected to thrust by a nut screwed onto said passage, wherein said cylindrical portion is extended away from the box by at least one radially deformable frustoconical tongue having at its end a clamping portion for clamping onto the periphery of a cable, wherein said at least one radially deformable frustoconical tongue comprises at least two tongues distributed around the periphery of said opposite end remote from the box.

2. A guide according to claim 1, wherein said clamping portion has locking teeth on its inside face directed towards the cable.

3. A guide according to claim 1, wherein a clamping collar is associated with said guide so as to be clamped onto said clamping portion.

4. A guide according to claim 1, having at least one locking spline on its end face directed towards the box.

5. A sealing assembly for cables, the assembly being designed for mounting at the inlet of the sealed box for protecting splices and containing a gas under pressure, the assembly including the guide according to claim 1.

6. An assembly according to claim 5, wherein said guide has at least one locking spline on its end face directed towards the box, the spline being designed to anchor in the sealing gasket placed in said tubular passage and prevented from rotating therein by an arrangement of associated splines and grooves, the guide being designed to have its opposite end subjected to thrust from the nut screwed onto said tubular passage.

\* \* \* \* \*